May 21, 1968            H. N. DEAN            3,384,468
APPARATUS FOR PRODUCING MULTIPLE SHEET GLAZING UNIT
Filed Feb. 10, 1965            2 Sheets-Sheet 1
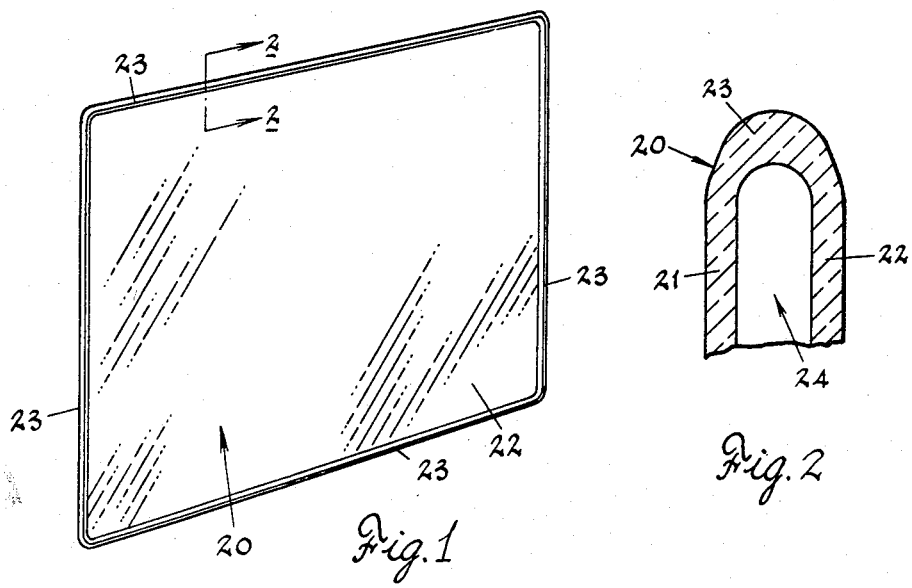
Fig. 1
Fig. 2
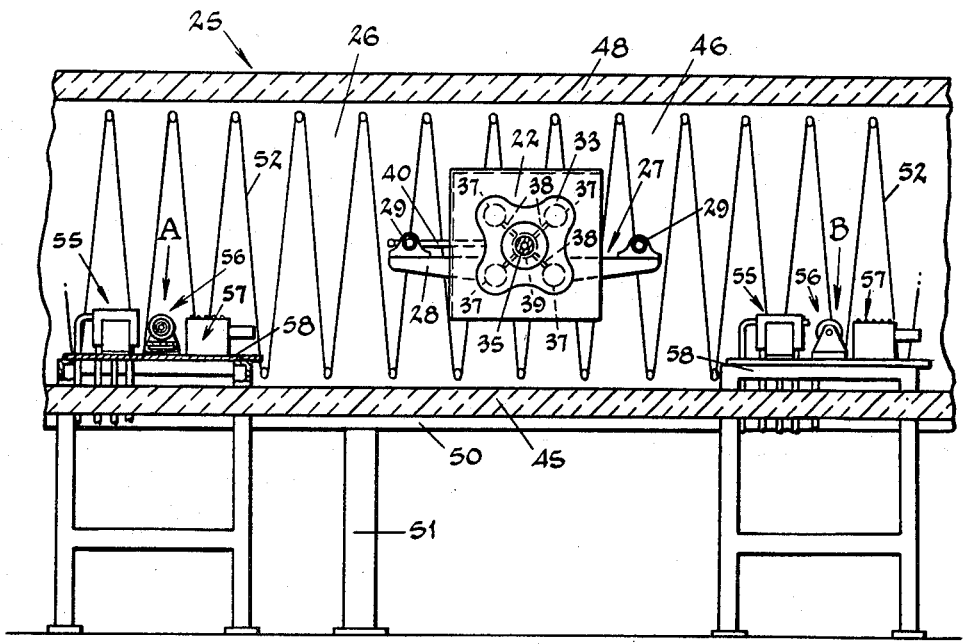
Fig. 3
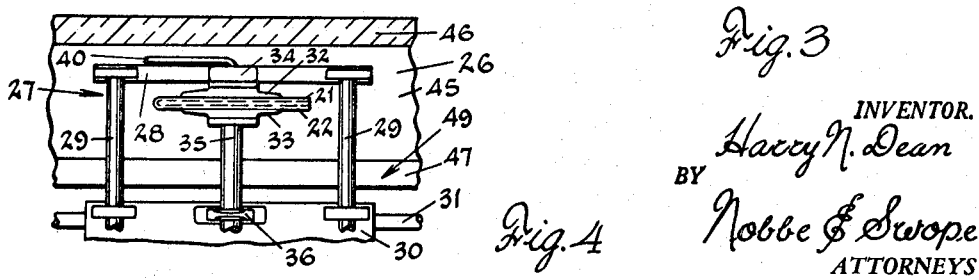
Fig. 4
INVENTOR.
Harry N. Dean
BY Nobbe & Swope
ATTORNEYS May 21, 1968 H. N. DEAN 3,384,468
APPARATUS FOR PRODUCING MULTIPLE SHEET GLAZING UNIT
Filed Feb. 10, 1965 2 Sheets-Sheet 2

INVENTOR.
Harry N. Dean
BY
Robbe & Swope
ATTORNEYS

United States Patent Office 3,384,468
Patented May 21, 1968

3,384,468
APPARATUS FOR PRODUCING MULTIPLE
SHEET GLAZING UNIT
Harry N. Dean, Perrysburg, Ohio, assignor to Libbey-Owens-Ford Glass Company, Toledo, Ohio, a corporation of Ohio
Filed Feb. 10, 1965, Ser. No. 431,659
3 Claims. (Cl. 65—152)

ABSTRACT OF THE DISCLOSURE

A self-centering edge forming roller for use in the production of all-glass multiple sheet glazing units. The roller is carried by horizontal shaft portions which are slidably mounted in bearing members for free horizontal movement whereby the roller will be centered at all times with respect to the edge portions of the glass sheets which are being fused to one another to form the sealed edge of the unit. Means are also provided for urging the roller toward the glass sheets.

---

The present invention relates broadly to the production of all-glass multiple sheet glazing units composed of two or more sheets of glass arranged in spaced face-to-face relation and fused together at their edges to provide a dead air space therebetween.

More particularly this invention is concerned with improved apparatus for shaping the heated edge portions of the glass sheets and bringing them into fusion contact with one another.

In one general procedure, glazing units of the above character are produced by supporting the sheets in spaced face-to-face relationship in substantially vertical planes for movement along a predetermined path past sealing devices operable to fuse the marginal edge portions of the sheets together. These sealing devices include means for heating the marginal edge portions of each of the glass sheets to the fusion temperature of the glass and forming means which engage the heated edge portions and bring them into fusion contact with one another. The sealing of the edges of the sheets is thus accomplished by a continuous procedure in which the edges of the sheets are progressively fused together as the sheets are advanced along the path.

One of the problems encountered in the prior art devices is that the power driven or substantially fixed shaping tools employed have exerted pressures that deform portions of the sheets inwardly of the edge wall leaving distortion areas visible in the completed unit. More specifically, the shaping tools of prior art have caused such deformation in the form of a bulge in the sides of the unit adjacent the edge wall and thereby creating a non-uniform thickness adjacent the peripheral edges in the completed glazing units. Also, excessive pressures on one or both sides of the unit by the shaping tools of prior art have caused collapsing of the unit adjacent its peripheral edge.

Accordingly, it is the primary object of this invention to provide a more flexible type of shaping tool that will form an edge of the desired character without exerting unwanted or distorting pressures on the glass sheet.

Another object is to provide a shaping tool which will automatically accommodate itself to aligning itself with the glass sheets of each unit being formed.

A further object is to provide a shaping tool having freedom of movement in two directions.

Other objects and advantages of the invention will become more apparent during the course of the following description when read in connection with the accompanying drawings.

In the drawings, wherein like numerals are employed to designate like parts throughout the same:

FIG. 1 is a perspective view of an all-glass multiple sheet glazing unit of the type with which this invention is concerned;

FIG. 2 is a sectional view taken along line 2—2 of FIG. 1;

FIG. 3 is a fragmentary vertical longitudinal sectional view of the apparatus for producing all-glass multiple sheet glazing units and including that of the present invention;

FIG. 4 is a fragmentary plan view of the unit handling apparatus of FIG. 3;

Figure 5:
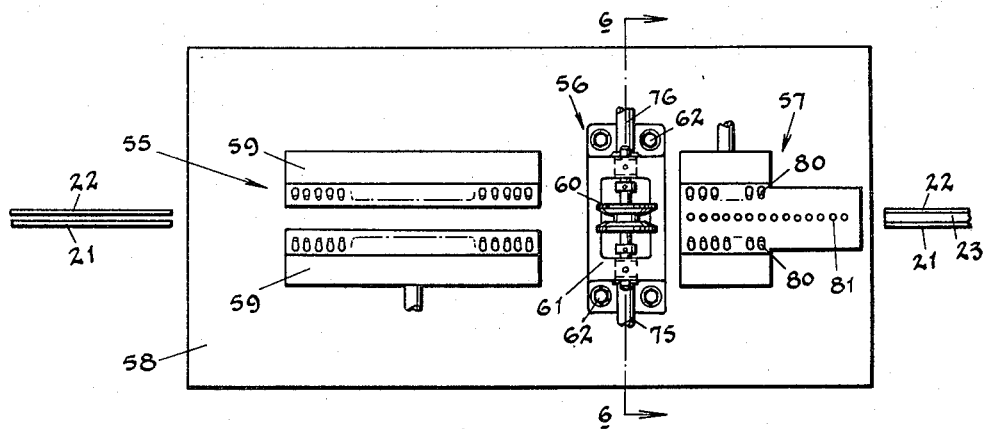
FIG. 5 is a plan view of one of the sealing stations.

With reference now to the drawings, there is shown in FIGS. 1 and 2, an all-glass double glazing unit 20 which comprises two spaced sheets of glass 21 and 22 having the marginal portions thereof fused to one another to provide edge walls 23 surrounding the unit and enclosing a sealed, dead air space 24 therebetween.

For purposes of illustration, the forming and shaping device of the invention is shown in the drawings as incorporated in one form of apparatus, generally designated by the numeral 25, for producing the all-glass double glazing unit 20. As best shown in FIG. 3, the apparatus 25 includes a tunnel-type heating chamber or furnace 26 and a movable support means 27 for carrying spaced glass sheets 21 and 22, to be fused together around their edge portions, through the furnace. Arranged within the furnace 26 are a plurality of spaced sealing areas or stations, designated by the letters A and B, through which the glass sheets 21 and 22 are passed and within which the edge portions thereof are fused to one another.

In the production of all-glass multiple sheet glazing units according to the process disclosed herein, the sheets of glass carried by the support means 27 are passed through a sealing station, as at A, to form one edge wall and are then rotated on the support means 27 to locate the edge portions of another side of the glass sheets in position to be sealed together, as at sealing station B. Thus, in FIG. 3, the sheets 21 and 22 are indicated as having been sealed together along the top and left hand edge and with the bottom edge positioned for the next sealing operation.

The support means 27 is of the type disclosed in Patent No. 2,968,125, issued Jan. 17, 1962, and comprises a beam 28 extending longitudinally within the furnace and mounted by transverse bars 29 extending through a slot 49, on a carriage 30 that is supported on and translatable along a rail structure generally indicated at 31 in FIG. 4 and which is mounted exteriorly of the furnace.

Mounted on the carriage 30 are a pair of vacuum platens 32 and 33, one for each sheet of glass, which platens support the sheets in substantially vertical, spaced parallel relation with respect to one another while they are moved through the furnace and the edge portions thereof fused to one another. More specifically, the platen 32 is rotatably mounted in a bracket 34 on the beam 28 while the platen 33 is carried by a tubular bar 35 that is mounted on the carriage 30 by bracket 36. The tubular bar 35 is adapted to be turned during forward movement of the carriage 30 and between the sealing stations to progressively rotate the glass sheets so that a succeeding pair of spaced edge portions will be brought into position to be sealed together.

The opposed surfaces of the platens 32 and 33 are each provided with suitably formed recesses 37 through which reduced air pressure or a vacuum can be applied to the glass sheets to support them against the platens. Communicating grooves 38 are formed in the surfaces of the platens to connect the recesses 37 with centrally formed bores 39 which, in one instance, connect with a suitable source of vacuum through a tube 40 and, in the other instance, through the hollow bar 35.

The furnace 26 (FIGS. 3 and 4) comprises a bottom wall 45, side walls 46 and 47 and a roof or top wall 48; the side wall 47 being provided with a horizontally disposed slot 49 through which the bars 29 and 35 project from the externally mounted carriage 30. The several walls of the furnace are all constructed of fire-brick or other suitable refractory material. The bottom wall 45 is supported by longitudinally extending beams 50 carried by vertically disposed support legs 51. The furnace is heated by a suitable heating means such as electrical resistance filaments 52 located along the inner surfaces of the side walls 46 and 47 as shown in FIG. 2 or by gas burners of any well-known type.

At each of the sealing stations A and B, there is provided a sealing means which includes (FIGS. 3 and 5) a fusion burner assembly 55, an edge forming and shaping device 56 and a polishing burner assembly 57, all mounted on a suitable frame 58 carried by the bottom wall 45 of the furnace 26.

Briefly stated, the fusion burner assembly 55 which is for heating the marginal edge portions of the sheets to the desired fusion temperature of glass includes a pair of opposed burner heads 59 mounted on the frame 58 at opposite sides of the path of travel of the glass sheets carried by the support means 27 and spaced apart to permit the sheets to pass therebetween.

The burner heads are mounted for directing flames towards the lower edges of the sheets moving along the path. In order to achieve the ideal configuration of the completed unit having a planar side walls and merging at the periphery of the unit to a substantially semi-circular edge wall, the flames must be directed only to the edge portions of the sheets that will be contacted by the shaping tool.

Immediately upon being moved past the fusion burner assembly 55, the heat-softened edge portions of the sheets are brought into engagement with an edge forming and shaping device 56 which forms the edge of the ultimate unit by bending the marginal portions of the glass sheets toward one another and pressing them into fusion contact to form and shape the completed edge wall 23 (FIG. 2).

In the prior art devices of the power driven or substantially fixed types, any misalignment in a vertical or horizontal direction of the sheets and the edge forming and shaping device would cause undue pressure on the edges of the sheets thereby creating bulges and collapsing adjacent the marginal edge portions of the completed unit. These pressures are reduced by use of the forming and shaping device shown in FIGS. 6 and 7. The forming and shaping device 56 includes a roller or tool 60 having inclined surfaces 60a mounted on frame 58 by means of a supporting member 61 secured to frame 58 with bolts 62. The roller 60 is supported on supporting member 61 by means of a shaft 63 journaled in bearing members 64 which are housed in bearing blocks 65 located on opposite sides of the path of travel of the glass sheets. The bearing blocks 65 are mounted for vertical movement in openings 66 located in upper portions of supporting member 61 and are retained in the openings by plates 67 secured with screws 68. The bottom surface of each bearing block has counter bored openings 70, receiving springs 71 to urge the bearing blocks towards the upper surface of the opening thereby urging the roller towards the lower edges of said sheets. Mounted on the shaft 63 are limit stops 72 held on the shaft by means of set screws 73.

Figure 6:
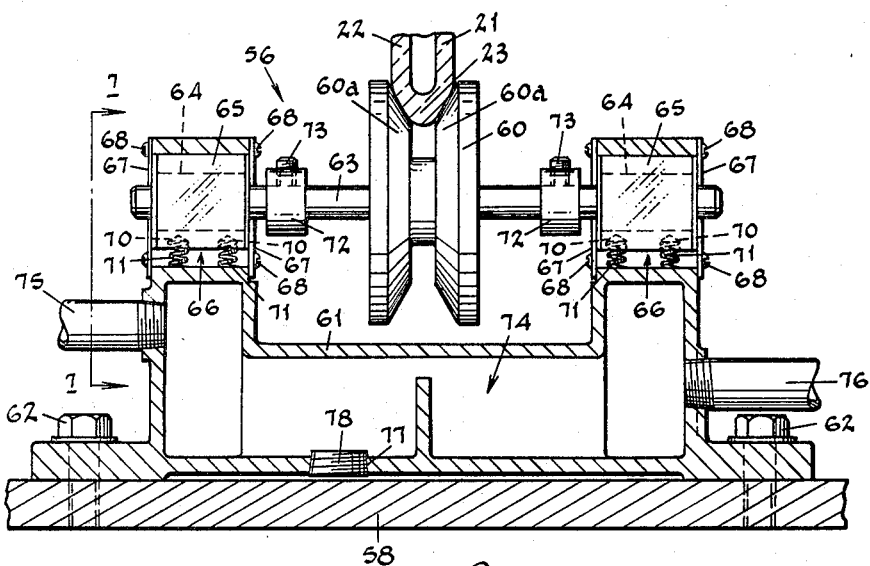
FIG. 6 is a transverse sectional view of the forming and shaping tool of the invention taken along line 6—6 of FIG. 5.
Figure 7:
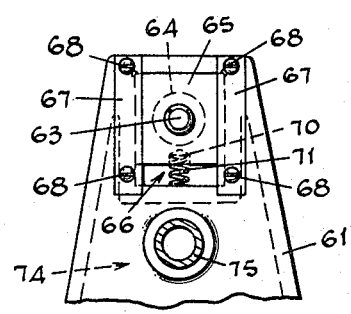
FIG. 7 is a fragmentary view taken along line 7—7 of FIG. 6.

As the sheets leave the fusion burner area where the edge portions thereof have been heated to the bending temperature of the glass, they engage surfaces 60a of roller 60, which is free to rotate with the relative movement of the sheets, and acts to force or bring the edge portions of the respective sheets 21 and 22 into contact with one another. As can be seen in FIG. 6, by having a single forming roller mounted for relatively free horizontal movement the roller will be centered at all times upon the portion of the spaced sheets being formed. This self-centering feature ensures pressures being applied to opposite sides of sheets 21 and 22 will be equal at all times.

Also, by spring-biasing the bearing blocks receiving shafts 63, any excessive vertical pressure caused by the sheets engaging the roller below the desired vertical position will be taken up by the springs.

The disclosed structure will thus eliminate the nonuniformity of the finished unit at its peripheral edge. Thus in cross-section, the unit will have a uniform thickness from edge wall to edge wall.

The support member 61 includes a passage 74 in the lower portion thereof to carry a coolant, such as water, reducing the temperature of bearing members 64 within the furnace 26. The coolant enters the passage by means of a pipe 75 and leaves the passage through pipe 76. An opening 77 having a plug 78 is provided in the lower wall of the passage to drain the passage if desired.

As a final step in the edge sealing operation, the formed edge wall, upon emerging from the forming roller 60, passes over the polishing burner assembly 57. As shown in FIG. 5, the assembly 57 includes rows of angularly disposed burner tips 80 at opposite sides of the path and operable to direct flames angularly upwardly against the outer surface of the edge wall and an interposed row of substantially vertically disposed burner tips 81 extending along the path and positioned to direct flames upwardly against the edge wall as it passes thereover. These flames serve to fire-polish the edge wall thereby to smooth out and remove any surface irregularities therein and, at the same time, improve and strength of the edge wall.

Although the forming roller has been specifically disclosed as a one piece member it is considered within the spirit of the invention to use two separate elements which are adjustably secured to the shaft 63. Furthermore, two separate rollers mounted in a horizontal plane may have incorporated therein the disclosed means of limited free movement in the two directions. Also the inclination and contour of the surfaces 60a may be varied to form the desired curvature of edge wall 23.

It is to be understood that the form of the invention herewith shown and described is to be taken as an illustrative embodiment only of the same, and that various changes in the shape, size and arrangement of parts may be resorted to without departing from the spirit of the invention or the scope of the subjoining claims.

I claim:

1. An apparatus for producing all-glass multiple sheet glazing units, means for supporting two sheets of glass in vertical spaced face-to-face relation and for conveying them along a defined path, means located along the path of movement of the glass sheets for heating the margins thereof to fusing temperature, a roller located in said path and having opposed surfaces for receiving the marginal edge portions of the glass sheets therebetween and for forcing them into fusion contact with one another, bearing members mounted at opposite sides of said path, and horizontal shaft portions carrying said roller and slidably received in said bearing members to permit free reciprocatory movement of said roller transversely of said path, whereby to assure alignment of the roller with the glass sheets as said sheets move along said path.

2. An apparatus for producing all-glass multiple sheet glazing units as defined in claim 1, including adjustable limit stops mounted on said shaft portions to limit the horizontal movement of said roller.

3. An apparatus for producing all-glass multiple sheet glazing units as defined in claim 1, wherein said bearing members are mounted for vertical movement with respect to said sheets and biasing means engaging said bearing members for urging said roller towards said sheets.

References Cited

UNITED STATES PATENTS

| | | | |
|---|---|---|---|
| 1,924,580 | 8/1933 | Watkins | 156—107 |
| 3,205,056 | 9/1965 | Roetter et al. | 65—152 |
| 3,273,988 | 9/1966 | Dean et al. | 65—58 |
| 3,278,286 | 10/1966 | Nitsche et al. | 65—86 |

DONALL H. SYLVESTER, *Primary Examiner.*

E. D. FREEDMAN, *Assistant Examiner.*